(12) United States Patent
Yoakim et al.

(10) Patent No.: US 9,271,598 B2
(45) Date of Patent: Mar. 1, 2016

(54) METHOD FOR PREPARING A FOOD LIQUID CONTAINED IN A CAPSULE BY CENTRIFUGATION AND DEVICE ADAPTED FOR SUCH METHOD

(75) Inventors: Alfred Yoakim, St. Legier la Chiesaz (CH); Jean-Paul Denisart, La Conversion (CH); Antoine Ryser, Lausanne (CH)

(73) Assignee: Nestec S.A., Vevey (CH)

( * ) Notice: Subject to any disclaimer, the term of this patent is extended or adjusted under 35 U.S.C. 154(b) by 556 days.

(21) Appl. No.: 12/602,553

(22) PCT Filed: May 26, 2008

(86) PCT No.: PCT/EP2008/056412
§ 371 (c)(1),
(2), (4) Date: Dec. 1, 2009

(87) PCT Pub. No.: WO2008/148656
PCT Pub. Date: Dec. 11, 2008

(65) Prior Publication Data
US 2010/0203208 A1  Aug. 12, 2010

(30) Foreign Application Priority Data

Jun. 5, 2007 (EP) .................................... 07109579
Feb. 29, 2008 (EP) .................................... 08102147

(51) Int. Cl.
*B65D 85/804* (2006.01)
*A47J 31/22* (2006.01)
*A47J 31/36* (2006.01)
*A47J 31/20* (2006.01)

(52) U.S. Cl.
CPC .............. *A47J 31/22* (2013.01); *A47J 31/3628* (2013.01); *B65D 85/8043* (2013.01); *A47J 31/20* (2013.01); *A47J 31/3614* (2013.01)

(58) Field of Classification Search
USPC .............................. 426/433, 435, 431; 99/287
See application file for complete search history.

(56) References Cited

U.S. PATENT DOCUMENTS

| 239,659 A | 4/1881 | Houston |
| 1,963,476 A | 6/1934 | Smith ............................. 210/67 |

(Continued)

FOREIGN PATENT DOCUMENTS

| AT | 197553 B | 5/1958 |
| BE | 894 031 | 2/1983 |

(Continued)

OTHER PUBLICATIONS

Non Final Office Action, U.S. Appl. No. 12/602,577, dated Mar. 20, 2012.

(Continued)

*Primary Examiner* — Nikki H Dees
*Assistant Examiner* — Stephanie Cox
(74) *Attorney, Agent, or Firm* — Winston & Strawn LLP

(57) ABSTRACT

A method for preparing a food liquid from a food substance contained in a single-use capsule by passing water through the substance. The method includes centrifugally rotating the capsule while introducing water therein to pass the water through the substance to form the food liquid, opening at least one liquid delivery outlet in the capsule which is peripherally offset relative to the center of the capsule, and delivering the food liquid from the at least one liquid delivery outlet to dispense the beverage.

14 Claims, 11 Drawing Sheets

(56) References Cited

U.S. PATENT DOCUMENTS

| | | | |
|---|---|---|---|
| 2,778,739 A | 1/1957 | Rodth | 99/171 |
| 2,899,886 A | 8/1959 | Rodth | |
| 2,952,202 A | 9/1960 | Renner et al. | |
| 3,025,781 A | 3/1962 | Bossi | |
| 3,233,535 A | 2/1966 | Fowlie | |
| 3,269,298 A * | 8/1966 | Grundmann | 99/289 R |
| 3,566,770 A * | 3/1971 | Crossley | 99/289 R |
| 3,654,852 A | 4/1972 | Rosan, Sr. | |
| 3,812,773 A | 5/1974 | Hultsch | 99/290 |
| 3,822,013 A | 7/1974 | Van Der Veken | 206/233 |
| 3,967,546 A | 7/1976 | Cailliot | 99/286 |
| 3,985,069 A | 10/1976 | Cavalluzzi | 99/295 |
| 4,136,202 A | 1/1979 | Favre et al. | |
| 4,426,919 A | 1/1984 | Rhoten | 99/289 |
| 4,464,982 A | 8/1984 | Leuschner et al. | 99/287 |
| 4,473,002 A | 9/1984 | Leuschner et al. | 99/302 |
| 4,545,296 A | 10/1985 | Ben-Shmuel | 99/289 P |
| 4,584,101 A | 4/1986 | Kataoka | 201/474 |
| 4,806,375 A | 2/1989 | Favre | 426/433 |
| 4,846,052 A | 7/1989 | Favre et al. | |
| 4,859,337 A | 8/1989 | Woltermann | 210/474 |
| 4,962,693 A | 10/1990 | Miwa et al. | 99/283 |
| 5,047,252 A | 9/1991 | Liu et al. | 426/79 |
| 5,265,517 A | 11/1993 | Gilbert | 99/280 |
| 5,300,308 A | 4/1994 | Louridas | 426/112 |
| 5,325,765 A * | 7/1994 | Sylvan et al. | 99/295 |
| 5,343,799 A | 9/1994 | Fond | |
| 5,566,605 A | 10/1996 | Lebrun et al. | 99/302 |
| 5,637,335 A | 6/1997 | Fond et al. | 426/84 |
| 5,649,472 A | 7/1997 | Fond et al. | 99/295 |
| 5,656,311 A | 8/1997 | Fond | |
| 5,755,149 A | 5/1998 | Blanc et al. | 99/289 |
| 5,773,067 A | 6/1998 | Freychet et al. | 426/506 |
| 5,826,492 A | 10/1998 | Fond et al. | |
| 5,948,455 A | 9/1999 | Schaeffer et al. | 426/77 |
| 6,007,853 A | 12/1999 | Lesser | 426/77 |
| 6,607,762 B2 | 8/2003 | Lazaris et al. | 426/79 |
| 6,777,007 B2 | 8/2004 | Cai | 426/78 |
| 6,786,134 B2 | 9/2004 | Green | 99/289 P |
| 6,849,285 B2 | 2/2005 | Masek et al. | |
| 6,854,378 B2 | 2/2005 | Jarisch et al. | |
| 7,017,775 B2 | 3/2006 | Zettle et al. | 220/781 |
| 7,153,530 B2 | 12/2006 | Masek et al. | |
| 7,216,582 B2 | 5/2007 | Yoakim et al. | |
| 7,325,478 B2 | 2/2008 | Cautenet et al. | |
| 7,325,479 B2 | 2/2008 | Laigneau et al. | |
| 7,469,627 B2 | 12/2008 | Li | 99/286 |
| 7,569,242 B2 | 8/2009 | Barber et al. | |
| 7,569,243 B2 | 8/2009 | Yoakim et al. | |
| 7,770,512 B2 | 8/2010 | Albrecht | 99/295 |
| 7,981,451 B2 | 7/2011 | Ozanne | |
| 8,151,694 B2 | 4/2012 | Jacobs et al. | |
| 8,307,754 B2 | 11/2012 | Ternite et al. | |
| 8,327,754 B2 | 12/2012 | Kirschner et al. | |
| 8,409,646 B2 | 4/2013 | Yoakim et al. | |
| 8,431,175 B2 | 4/2013 | Yoakim et al. | |
| 8,512,784 B2 | 8/2013 | Denisart et al. | |
| 8,813,634 B2 | 8/2014 | Yoakim et al. | |
| 2003/0116029 A1 | 6/2003 | Kollep | |
| 2003/0145736 A1 | 8/2003 | Green | 99/280 |
| 2003/0159593 A1 | 8/2003 | Leutwyler | |
| 2003/0189872 A1 | 10/2003 | Artman et al. | |
| 2004/0255790 A1 | 12/2004 | Green | |
| 2005/0150390 A1 | 7/2005 | Schifferle | 99/295 |
| 2005/0188854 A1 | 9/2005 | Green et al. | |
| 2006/0003075 A1 | 1/2006 | Meador | |
| 2006/0110507 A1* | 5/2006 | Yoakim et al. | 426/433 |
| 2006/0196364 A1 | 9/2006 | Kirschner | |
| 2006/0236871 A1 | 10/2006 | Ternite et al. | 99/295 |
| 2007/0079708 A1 | 4/2007 | Li | 99/279 |
| 2007/0248734 A1 | 10/2007 | Denisart et al. | |
| 2007/0289453 A1 | 12/2007 | Halliday | |
| 2008/0014860 A1 | 1/2008 | Heitman et al. | |
| 2008/0038414 A1 | 2/2008 | Veciana I Membrado et al. | |
| 2008/0122286 A1 | 5/2008 | Brock et al. | |
| 2008/0187638 A1 | 8/2008 | Hansen | |
| 2009/0032454 A1 | 2/2009 | Rapparini | 210/337 |
| 2009/0050540 A1 | 2/2009 | Imai et al. | |
| 2009/0136639 A1 | 5/2009 | Majer | 426/431 |
| 2009/0155422 A1 | 6/2009 | Ozanne | 426/89 |
| 2009/0218877 A1 | 9/2009 | Derman | |
| 2010/0024658 A1 | 2/2010 | Jacobs et al. | |
| 2010/0064899 A1 | 3/2010 | Aardenburg | 99/295 |
| 2010/0108541 A1 | 5/2010 | Roberto | |
| 2010/0173056 A1 | 7/2010 | Yoakim et al. | 426/433 |
| 2010/0176004 A1 | 7/2010 | Schneider et al. | 205/687 |
| 2010/0178392 A1 | 7/2010 | Yoakim et al. | 426/80 |
| 2010/0178404 A1 | 7/2010 | Yoakim et al. | 426/431 |
| 2010/0186599 A1 | 7/2010 | Yoakim et al. | 99/295 |
| 2010/0203198 A1 | 8/2010 | Yoakim et al. | 426/80 |
| 2010/0239734 A1 | 9/2010 | Yoakim et al. | 426/433 |
| 2011/0041702 A1 | 2/2011 | Yoakim et al. | 99/302 R |
| 2011/0052761 A1 | 3/2011 | Yoakim et al. | 426/77 |
| 2011/0189362 A1 | 8/2011 | Denisart et al. | 426/433 |
| 2011/0217421 A1 | 9/2011 | Perentes et al. | 426/80 |
| 2011/0244099 A1 | 10/2011 | Perentes et al. | 426/431 |
| 2011/0262601 A1 | 10/2011 | Manser et al. | |
| 2012/0058226 A1 | 3/2012 | Winkler et al. | |

FOREIGN PATENT DOCUMENTS

| | | |
|---|---|---|
| CA | 2625215 A1 | 4/2007 |
| CN | 101001555 | 10/1987 |
| CN | 1656983 | 8/2005 |
| DE | 2151920 A1 | 4/1973 |
| DE | 32 41 606 | 3/1984 |
| DE | 35 29 053 | 2/1987 |
| DE | 35 29 204 | 2/1987 |
| DE | 37 19 962 | 6/1988 |
| DE | 42 40 429 | 6/1994 |
| DE | 44 39 252 | 5/1996 |
| DE | 10355671 A1 | 6/2004 |
| DE | 10 2005 007 852 | 8/2006 |
| EP | 0521510 | 2/1975 |
| EP | 0242556 A1 | 10/1987 |
| EP | 0 250 810 A1 | 1/1988 |
| EP | 0 367 600 | 5/1990 |
| EP | 0 512 470 A1 | 11/1992 |
| EP | 0521187 A1 | 1/1993 |
| EP | 0 607 759 | 7/1994 |
| EP | 0 651 963 | 5/1995 |
| EP | 0 749 713 | 12/1996 |
| EP | 0 806 373 B1 | 11/1997 |
| EP | 1208782 B1 | 5/2002 |
| EP | 1 299 022 B1 | 4/2003 |
| EP | 1 654 966 B1 | 5/2006 |
| EP | 1 774 878 | 4/2007 |
| EP | 1 813 333 A2 | 8/2007 |
| EP | 2 000 062 A1 | 12/2008 |
| EP | 215502 B1 | 3/2011 |
| FR | 2 132 310 | 11/1972 |
| FR | 2 487 661 | 2/1982 |
| FR | 2 513 106 | 3/1983 |
| FR | 2 531 849 | 2/1984 |
| FR | 2 535 597 | 5/1984 |
| FR | 2617389 | 11/1987 |
| FR | 2 624 364 | 6/1989 |
| FR | 2 685 186 | 6/1993 |
| FR | 2 686 007 | 7/1993 |
| FR | 2 726 988 | 5/1996 |
| GB | 1 506 074 A | 4/1978 |
| GB | 2 416 480 | 4/1985 |
| GB | 2 227 405 A | 8/1990 |
| GB | 2 253 336 | 9/1992 |
| GB | 2 416 480 A | 2/2006 |
| JP | 50016225 A | 2/1975 |
| JP | 59-082817 A | 5/1984 |
| JP | 62254719 A | 11/1987 |
| JP | 63034581 U | 3/1988 |
| JP | 02124111 A2 | 5/1990 |
| JP | 02189114 A2 | 7/1990 |
| JP | 61-04091 B | 12/1994 |
| JP | 06339431 A2 | 12/1994 |
| JP | 3034606 | 2/1997 |

(56) References Cited

FOREIGN PATENT DOCUMENTS

| | | |
|---|---|---|
| JP | 2001061663 A | 3/2001 |
| JP | 2002189115 A | 7/2002 |
| JP | 2002215414 A | 8/2002 |
| JP | 2003144973 A2 | 5/2003 |
| JP | 2004517654 A | 6/2004 |
| JP | 2005516602 | 6/2005 |
| JP | 2005199071 A2 | 7/2005 |
| JP | 2005525146 A | 8/2005 |
| JP | 2006515764 A | 6/2006 |
| JP | 2006518226 A | 8/2006 |
| JP | 2008508041 A | 3/2008 |
| JP | 2008520298 A | 6/2008 |
| TW | 200718383 | 5/2007 |
| WO | WO 94/02059 A1 | 2/1994 |
| WO | WO 02/17760 A1 | 3/2002 |
| WO | WO 02/35977 A1 | 5/2002 |
| WO | WO2004/030500 A1 | 4/2004 |
| WO | WO2005/066040 A2 | 7/2005 |
| WO | WO 2006/082064 A1 | 8/2006 |
| WO | WO 2006/112691 | 10/2006 |
| WO | WO2007/014584 A1 | 2/2007 |
| WO | WO 2007/041954 | 4/2007 |
| WO | WO2007042414 A1 | 4/2007 |
| WO | WO 2007/085921 A2 | 8/2007 |
| WO | WO 2007/110768 A2 | 10/2007 |
| WO | WO 2008/087099 A2 | 7/2008 |
| WO | WO 2008/148601 A1 | 12/2008 |
| WO | WO 2008/148604 | 12/2008 |
| WO | WO 2008/148646 | 12/2008 |
| WO | WO 2008/148650 | 12/2008 |
| WO | WO 2008/148834 | 12/2008 |
| WO | WO 2009/050540 A1 | 4/2009 |
| WO | WO 2009/106175 A1 | 9/2009 |
| WO | WO 2009/106598 A1 | 9/2009 |
| WO | WO 2009/133134 A1 | 11/2009 |
| WO | WO 2010/026045 A1 | 3/2010 |
| WO | WO 2010/026053 A1 | 3/2010 |
| WO | WO 2010/038213 A2 | 4/2010 |
| WO | WO 2010/041179 A2 | 4/2010 |

OTHER PUBLICATIONS

Non Final Office Action, U.S. Appl. No. 12/602,562, dated Feb. 13, 2012.
Non Final Office Action, U.S. Appl. No. 12/602,542, dated Apr. 13, 2012.
Non Final Office Action, U.S. Appl. No. 12/602,730, dated May 17, 2012.
Non Final Office Action, U.S. Appl. No. 12/860,705, dated Mar. 16, 2012.
Non Final Office Action, U.S. Appl. No. 12/602,568, dated Mar. 20, 2012.
Green Mountain Coffee, New K-Cup Samplers Offer More Variety; Jul. 11, 2008, pp. 1-5. Accessed Mar. 6, 2012 from http://www.greenmountincafe.com/2008/07/new-k-cup-samplers-offer-more-variety/.
Chilean Patent Application No. CL-1652-2008, filed Jun. 5, 2008 (English in U.S. equivalent 2010/0173056 and WO2008/148601).
Chilean Patent Application No. CL-1653-2008, filed Jun. 5, 2008 (English in U.S. equivalent 2010/0186599 and WO2008/148604).
Chilean Patent Application No. CL-1655-2008, filed Jun. 5, 2008 (English in U.S. equivalent 2010/0178404 and WO2008/148646).
International Search Report mailed Feb. 9, 2010 for Application No. PCT/EP2009/060697 filed Aug. 19, 2009.
International Search Report mailed Feb. 8, 2010 for Application No. PCT/EP2009/060771 filed Aug. 20, 2009.
U.S. Appl. No. 12/602,542, filed Dec. 1, 2009.
U.S. Appl. No. 12/602,562, filed Dec. 1, 2009.
U.S. Appl. No. 12/602,568, filed Dec. 1, 2009.
U.S. Appl. No. 12/602,577, filed Dec. 1, 2009.
U.S. Appl No. 12/602,730, filed Dec. 2, 2009.
U.S. Appl. No. 12/776,155, filed May 7, 2010.
U.S. Appl. No. 13/061,558, filed Mar. 1, 2011.
U.S. Appl. No. 13/061,567, filed Mar. 1, 2011.
U.S. Appl. No. 12/856,369, filed Aug. 13, 2010.
U.S. Appl. No. 12/860,705, filed Aug. 20, 2010.
Written Opinion of the International Searching Authority and International Search Report, PCT/EP2008/056968, mailed Oct. 7, 2008.
Written Opinion of the International Searching Authority and International Search Report, PCT/EP2008/054401, mailed Sep. 11, 2008.
Written Opinion of the International Searching Authority and International Search Report, PCT/EP2008/056310, mailed Oct. 8, 2008.
Written Opinion of the International Searching Authority and International Search Report, PCT/EP2008/056345, mailed Oct. 1, 2008.
Written Opinion of the International Searching Authority and International Search Report, PCT/EP2008/054810, mailed Oct. 24, 2008.
European Search Report,EP 09174573.7, mailed Apr. 9, 2010.
Written Opinion of the International Searching Authority and International Search Report, PCT/EP2008/056412, mailed Sep. 11, 2009.
Non Final Office Action, U.S. Appl. No. 13/061,558, dated Dec. 6, 2012.
Final Office Action, U.S. Appl. No. 12/602,542, dated Oct. 4, 2012.
Final Office Action, U.S. Appl. No. 12/602,730, dated Sep. 18, 2012.
Non Final Office Action, U.S. Appl. No. 12/602,568, dated Jul. Oct. 19, 2012.
Non Final Office Action, U.S. Appl. No. 12/776,155, dated Jul. 18, 2012.
Final Office Action, U.S. Appl. No. 12/602,568, dated Jul. 16, 2012.
Final Office Action, U.S. Appl. No. 12/602,562, dated Jun. 22, 2012.
Final Office Action, U.S. Appl. No. 12/602,577, dated Jul. 20, 2012.
Final Office Action, U.S. Appl. No. 12/860,705, dated Jul. 18, 2012.
Restriction Requirement U.S. Appl. No. 13/133,613 dated Mar. 28, 2013.
Restriction Requirement U.S. Appl. No. 12/856,369 dated Feb. 15, 2013.
Notice of Allowance U.S. Appl. No. 12/776,155 dated Mar. 1, 2013.
Notice of Allowance U.S. Appl. No. 12/602,568 dated Dec. 1, 2012.
Advisory Action, U.S. Appl. No. 12/602,577 dated Oct. 11, 2012.
Non-Final Office Action, U.S. Appl. No. 13/602,542 dated Jun. 18, 2013.
Final Office Action, U.S. Appl. No. 13/061,558 dated May 21, 2013.
Notice of Allowance, U.S. Appl. No. 13/061,567 dated Jun. 11, 2013.
Non-Final Office Action, U.S. Appl. No. 13/061,567 dated May 10, 2013.
Non Final Office Action, U.S. Appl. No. 13/133,613, dated Jul. 18, 2013.
Non Final Office Action, U.S. Appl. No. 12/856,369, dated Jul. 30, 2013.
Non-Final Office Action, U.S. Appl. No. 12/602,577 dated Nov. 1, 2013.
Non-Final Office Action, U.S. Appl. No. 12/602,730 dated Dec. 17, 2013.
Advisory Action, U.S. Appl. No. 12/602,730 dated Jan. 18, 2013.
U.S. Appl. No. 13/061,558, Notice of Allowance, dated Sep. 26, 2014.
U.S. Appl. No. 12/602,542, Final Office Action, dated Jan. 30, 2014.
U.S. Appl. No. 13/061,558 Non-Final Office Action, dated Feb. 14, 2014.
U.S. Appl. No. 12/602,562, Non-Final Office Action, dated Jul. 17, 2014.
U.S. Appl. No. 12/602,577, Final Office Action, dated May 16, 2014.
U.S. Appl. No. 13/133,613, Final Office Action, dated Mar. 21, 2014.
Advisory Action, U.S. Appl. No. 12/602,577, May 16, 2014.
Notice of Allowance, U.S. Appl. No. 12/602,577, Nov. 14, 2014.
Advisory Action, U.S. Appl. No. 12/602,562, Sep. 25, 2012.
Advisory Action, U.S. Appl. No. 12/602,568, Sep. 27, 2012.
Notice of Allowance, U.S. Appl. No. 12/602,730, Apr. 29, 2014.
Restriction Requirement, U.S. Appl. No. 12/776,155, Apr. 30, 2012.
Final Office Action, U.S. Appl. No. 12/856,369, Mar. 10, 2014.
Advisory Action, U.S. Appl. No. 12/856,369, May 9, 2014.
Restriction Requirement, U.S. Appl. No. 12/860,705, Dec. 30, 2011.
Advisory Action, U.S. Appl. No. 12/860,705, Oct. 17, 2012.
Notice of Allowance, U.S. Appl. No. 12/860,705, Nov. 14, 2013.
Restriction Requirement, U.S. Appl. No. 13/061,558, Nov. 13, 2012.
Non-Final Office Action, U.S. Appl. No. 12/602,542, Jan. 13, 2015.
Non-Final Office Action, U.S. Appl. No. 12/602,562, Feb. 13, 2012.
Final Office Action, U.S. Appl. No. 12/602,562, Feb. 11, 2015.

\* cited by examiner

METHOD FOR PREPARING A FOOD LIQUID CONTAINED IN A CAPSULE BY CENTRIFUGATION AND DEVICE ADAPTED FOR SUCH METHOD

This application is a 371 filing of International Patent Application PCT/EP2008/056412 filed May 26, 2008.

Background

The present invention relates to a device and capsule system for preparing a food liquid from a food substance contained in a receptacle by passing water through the substance using centrifugal forces.

It is known to prepare beverages wherein a mixture consisting of brewed coffee and coffee powder is separated with centrifugal forces. Such a mixture is obtained by bringing hot water and coffee powder together for a defined time. The water is then forced through a screen, on which screen powder material is present.

Existing systems consist of placing the coffee powder in a receptacle which is usually a non-removable part of a machine such as in EP 0367 600B1. Such devices have many disadvantages. Firstly, the coffee powder must be properly dosed manually in the receptacle. Secondly, the centrifuged coffee waste becomes dry and it must be removed by scraping the surface of the receptacle. As a result, the coffee preparation requires a lot of manual handling and is so very time consuming. Usually coffee freshness can also vary a lot and this can impact on the cup quality because coffee comes generally from bulk package or coffee is ground from beans in the receptacle itself.

Also, depending on the manual dosage of coffee and the brewing conditions (e.g., centrifugal speed, receptacle size) the cup quality can vary a lot.

Therefore, these systems have never reached an important commercial success.

In German patent application DE 102005007852, the machine comprises a removable holder into which an open cup-shaped part of the receptacle is placed; the other part or lid being attached to a driving axis of the machine. However, a disadvantage is the intensive manual handling. Another disadvantage is the difficulty to control quality of the coffee due to a lack of control for the dosing of the powder and a lack of control of the freshness of the coffee powder.

Other devices for brewing coffee by centrifuge forces are described in WO 2006/112691; FR2624364; EP0367600; GB2253336; FR2686007; EP0749713; DE4240429; EP0651963; FR2726988; DE4439252; EP0367600; FR2132310; FR2513106; FR2487661; DE3529053; FR2535597; WO2007/041954; DE3529204; DE3719962; FR2685186; DE3241606 and U.S. Pat. No. 4,545,296.

However, the effect of centrifugal forces to brew coffee or prepare other food substances presents many advantages compared to the normal brewing methods using pressure pumps. For example, in "espresso" coffee-type brewing methods, it is very difficult to master all the parameters which influence the quality of extraction of the delivered coffee extract. These parameters are typically the pressure, the flow rate which decreases with the pressure, the compaction of the coffee powder which also influences the flow characteristics and which depends on the coffee ground particle size, the temperature, the water flow distribution and so on.

Therefore, there is a need for proposing a new capsule system and a method adapted therefore for which the extraction parameters can be better and more independently controlled and therefore can be better mastered for controlling quality of the delivered food liquid.

At the same time, there is a need for a way of preparing a food liquid which is more convenient compared to the prior art centrifugal coffee preparation devices and which provides a better in-cup quality with a higher control of important quality parameters such as freshness and accurate dosage of the substance in the receptacle.

SUMMARY OF THE INVENTION

Therefore, the invention relates to a liquid food preparation device for preparing a liquid food from a food substance contained in a single-use capsule, removably insertable in the device, by passing water through the substance in the capsule, comprising a water injection head in the capsule and a capsule holder for holding the capsule in the device, characterized in that it comprises:

- a water injector, as part of the water injection head, arranged for introducing water along a central axis relative to the capsule holder,
- means for driving the capsule holder in centrifugation around an axis of rotation (I) aligned with said central axis of the capsule holder and,
- at least one opening means for providing at least one liquid delivery outlet in the capsule which is placed in a position relatively offset to said central axis of the capsule holder.

In a mode, the said opening means for providing the liquid delivery outlet(s) is at least one piercing member and/or cutting member and/or burning member.

More particularly, the water injecting head comprises a non-moving water injector and a rotary engaging member for engaging the capsule in closure onto the capsule holder. The engaging member thus rotates in conjunction with the capsule holder during centrifugation of the capsule in the device.

In one mode, the opening means of the liquid delivery outlet(s), e.g., piercing members or other means, can be part of the rotary engaging member of the water injection head.

In an alternative possible configuration, the opening means of the liquid delivery, e.g., piercing members or other means, can be part of the capsule holder.

In a mode, the opening means comprises a series of opening means, e.g., piercing members or other means, distributed along a substantially circular path about the central axis.

The opening means, e.g., piercing members, engages the capsule in such a way that the rotational momentum can be transmitted from the device to the capsule.

In a first mode, the opening members, e.g. piercing members, can be arranged in the device in such a manner to pierce the outlet(s) of the capsule during closure of the device about the capsule. In particular, the opening members are mounted on the rotary engaging member or capsule holder to open the capsule, e.g., pierce the liquid inlet(s) in the capsule, during relative engagement or closure of the rotary engaging member and the capsule holder about the capsule. For instance, piercing members are placed sufficiently in relief relative to the surface of the water injection head to pierce the capsule when the head approaches and engages the capsule in closure.

Preferably, the series of piercing members comprises at least four members for forming at least four small liquid delivery outlets at the periphery of the capsule. The piercing members can be distributed at 90-degree intervals therefore providing a homogeneous liquid delivery at the periphery of the capsule.

The piercing members can engage the capsule and so participate to transfer the rotational momentum to the capsule during rotation.

In another mode, the opening members are configured to create the liquid delivery outlet(s) of the capsule after a certain quantity of water is filled in the capsule.

The capsule may comprise a perforable membrane made of an aluminium and/or polymer materials. In particular, the puncturable membrane can have a thickness between 10 and 200 microns.

In a possible aspect of the invention, the water injector also comprises an opening means such as a piercing member. The opening means can be a piercing member arranged as a hollow piercing tube for injecting water in the centre of the capsule.

The piercing member of the water injector has a diameter of less than 5 mm, preferably, between 0.9 and 2.9 mm. Indeed, the pressure in the capsule increases from the centre to the periphery. The pressure of water in the centre can be close to zero but can gradually increase outwardly. Therefore, a small diameter of the injector provides a small inlet in the capsule to reduce the pressure at the inlet side of the capsule.

The driving means of the capsule holder can be directly connected to the capsule holder or indirectly connected to the capsule holder. A direct connection to the capsule holder can be obtained by a rotational drive assembly comprising a rotary motor and a drive transmission connecting the motor to the bottom of the capsule holder. The drive transmission may comprise a suitable gear reduction or amplification to provide the correct transmission rate to the capsule holder in function of the motor speed. An indirect connection to the capsule holder can be obtained by transmission of the rotational momentum from the water injection head to the capsule holder. In this case, the drive transmission of the rotational drive assembly is connected directly to the upper side of the water injection head, in particular to the rotary engaging member of the head.

The device of the invention may receive capsules made of rigid, semi-rigid and/or soft materials. The capsule may be made of materials such as plastics, aluminium, cellulose-based materials or other biodegradable materials, and combinations therefore. Preferably, the capsule has a peripheral wall made of a pierceable membrane. The membrane can form a sealing lid covering a cup-shaped body which receives the food substance to be brewed.

In a mode, a valve means is arranged downstream of the opening means of the at least one liquid delivery outlet of the capsule. The valve means may comprise an annular closure ring and an elastic means for elastically engaging the ring in closure onto a peripheral part, e.g., an edge, of the capsule.

The invention also relates to a method for preparing a food liquid from a food substance contained in a single-use capsule by passing water through the substance comprising:
 driving the capsule in centrifugal rotation while introducing water in the centre of capsule,
 passing water through the substance to form a food liquid,
 opening at least one liquid delivery outlet in the capsule which is peripherally offset relative to the centre of the capsule and delivering said liquid from said at least one liquid delivery outlet.

In a possible aspect of the method, the at least one liquid delivery outlet is obtained by piercing the capsule in the device. Thus, the capsule can be a gas tightly sealed capsule comprising ingredients such as ground coffee, instant coffee, leaf tea, cocoa, chocolate, a creamer, sweetener, and combinations thereof which can be preserved in protected atmosphere conditions for an extended period of time. The capsule is thus opened at the time of use in the device.

According to an aspect of the method, at least one liquid delivery outlet is obtained by piercing a sealing membrane of the capsule. The membrane can be formed of plastic and/or metal material.

In a mode of the invention, the at least one inlet opening is carried out by mechanical piercing effect of the capsule, e.g., with an external piercing means of the device being displaced relatively to the capsule.

In this case, piercing is carried out when the capsule is inserted in the device such as by effect of the device closing about the capsule.

According to the method, water is introduced in the capsule through an opening of less than 5 mm, preferably between 0.9 and 2.9 mm. As aforementioned, a sufficiently small water inlet is preferred in the capsule in order to reduce the internal pressure of liquid at the inlet side of the capsule and therefore avoid leakage problems.

Preferably, water is introduced in the centre of the capsule after having pierced a water inlet in the centre of the capsule.

According to an aspect of the invention, the food liquid delivered from the capsule is passed via a flow restriction means. The flow restriction means can be configured for providing a pressure drop of at least 0.5 bar of relative pressure during centrifugation. Preferably, the flow restriction means is configured for providing a pressure drop of between 1 and 6 bar, most preferably between 1.5 and 4 bar, of relative pressure during centrifugation. A flow restriction within the flow path of the centrifuged liquid enables to control the release of the centrifuged liquid for improving the interaction of water with the substance within the capsule as well as providing eventually foam to the liquid by the pressure release and the shear stresses which are created at the restriction. More particularly, the flow restriction means enables to maintain a pressure of several bars at the periphery of the enclosure and to retard the release of the liquid.

More particularly, the liquid delivered from the capsule opens a valve for opening when a certain pressure is exerted on the valve by the centrifuged liquid. The valve also regulates the flow of liquid and it reduces the risk of blocking the small outlets provided in the capsule by small size particles, e.g., coffee fines, in particular, at relatively low pressure values.

The valve can be part of the capsule or can be part of the device.

As a result, the system of the invention provides a solution for preparing a food liquid wherein a controlled release of the food liquid can be carried out. For example, the release of liquid can be delayed until a certain pressure is exerted on the valve means. A delayed opening of the valve means enables to improve the interaction between water and the substance contained in the capsule and reduces the risk of the flow blocking in the capsule.

For coffee, for example, it may be advantageous to optimize interaction of water and the ground coffee particles to obtain a good extraction of the coffee and aroma compounds. Moreover, the valve means provides a restriction which may improve the creation of foam or coffee crema.

The valve means can be formed by at least one engaging portion of the device which moves relatively to an engaging portion of the capsule under the effect of the pressurized liquid for making a thin annular laminating passage for the liquid. The laminating passage also enables to create a liquid jet of relatively high velocity that impacts on a wall of the device. As a result, a relatively high amount of foam can be created both due to the restriction that is created by the valve means and by the impact of the liquid on the impact surface of the device at a relatively high velocity during centrifugation. Depending on the amount of pressure exerted on the valve means by the centrifuged liquid, the restriction caused by the valve means can differ in amplitude.

In a possible mode, the valve means can be calibrated or adjusted to selectively open a liquid passage through the device at a threshold of pressure in the capsule.

The liquid delivered from the capsule can also be filtered by filtering means provided in the capsule. Such a configuration has many advantages because the device is simplified, the filter does not require cleaning since it is discarded with the capsule.

The term "food liquid" has here a broad meaning and encompasses: a culinary liquid such as soup or sauce, a beverage liquid such as coffee extract (obtained from ground and/or instant coffee powder), liquid chocolate, milk (obtained from powder and/or liquid concentrate), tea extract (obtained from instant and/or leaf), etc., or a nutritional liquid such as an infant formula and combinations thereof.

The terms "brewing" or "brewed" is not to be taken in the narrow sense of extracting under pressure a liquid from a non-entirely soluble substance (such as ground coffee or leaf tea) but is to be taken in a broader sense as encompassing the interaction processes of a food substance and a liquid, preferably water, including the processes of extraction, infusion, adsorption, dissolution, dilution, dispersion, mixing, emulsifying, foaming and the like.

The term "piercing" is to be taken in its broad sense and it includes the mechanical and/or thermal processing for providing a through-opening in a wall of the capsule.

BRIEF DESCRIPTION OF THE DRAWINGS

Additional features of the invention will appear in the detailed description of the figures which follows.

DETAILED DESCRIPTION OF THE INVENTION

Figure 1:
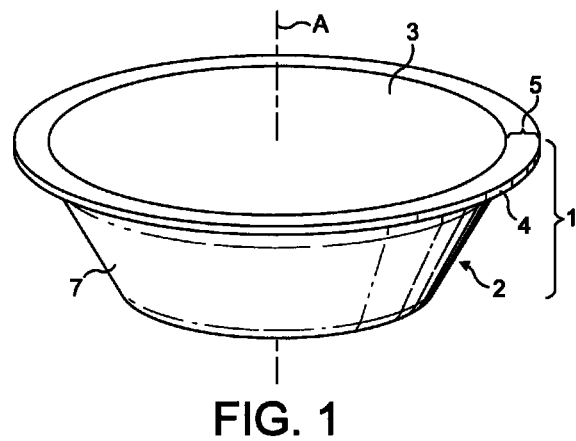
FIG. 1 is a perspective view from above of a capsule of the invention.
Figure 2:
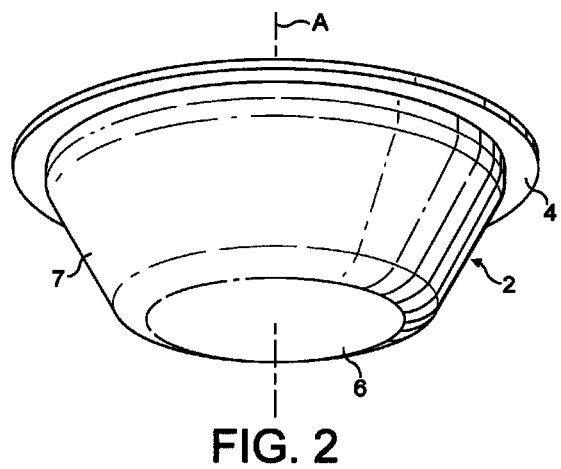
FIG. 2 is a perspective view from below of the capsule of the invention.
Figure 3:
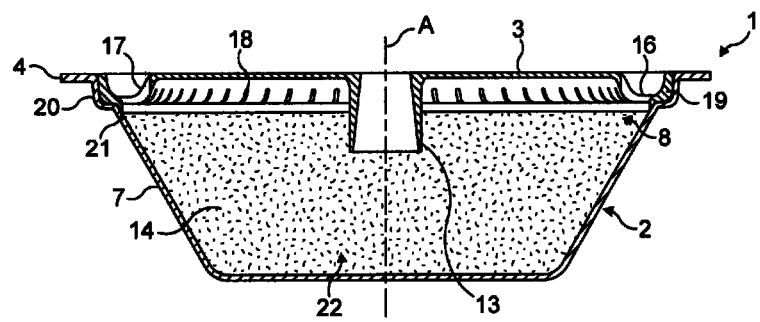
FIG. 3 is perspective view of the capsule with the sealing foil removed.
Figure 4:
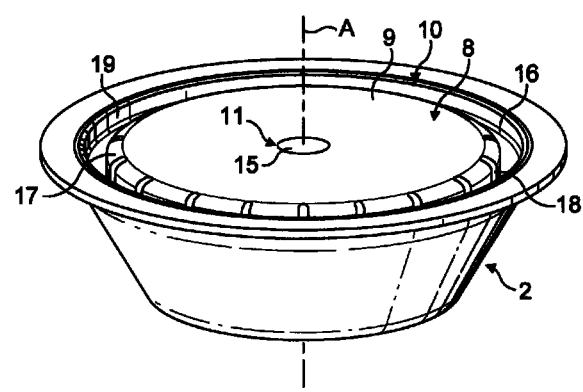
FIG. 4 is a cross section view of the capsule of the invention.

As shown in FIGS. 1 and 2, a preferred capsule 1 of the invention generally comprises a dished body 2 onto which is sealed a sealing foil 3. The sealing foil 3 is sealed onto a peripheral rim 4 of the body at a sealing annular portion 5. The rim 4 can extend outwards forming a small annular portion, e.g., of about 2-5 mm. The dished body comprises a bottom wall 6 and a side wall 7 which preferably widens in direction of the large open end of the body opposed to the bottom wall. The dished body is preferably rigid or semi-rigid. It can be formed of a food grade plastics, e.g., polypropylene, with a gas barrier layer such as EVOH and the like or aluminium alloy or a complex of plastic and aluminium alloy. The sealing foil 3 can be made of a thinner material such as a plastic laminate also including a barrier layer or aluminium alloy or a combination of plastic and aluminium alloy. The sealing foil is usually of a thickness between 50 and 250 microns, for example. The sealing foil member can be pierced for creating the water inlet and the beverage outlet(s) as will be described later in the description.

Figure 5:
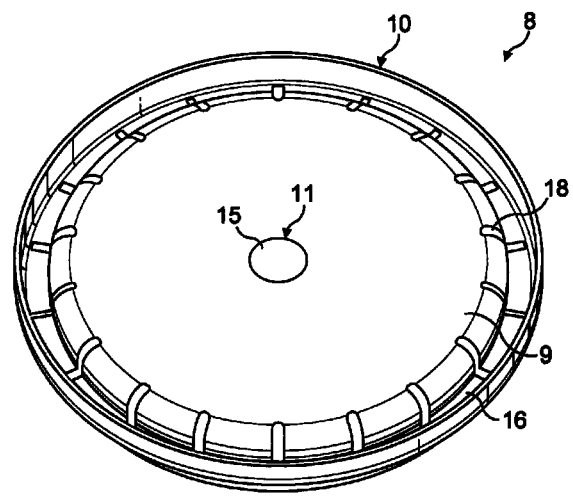
FIG. 5 is a perspective view of the lid from above of the capsule of the invention.
Figure 6:
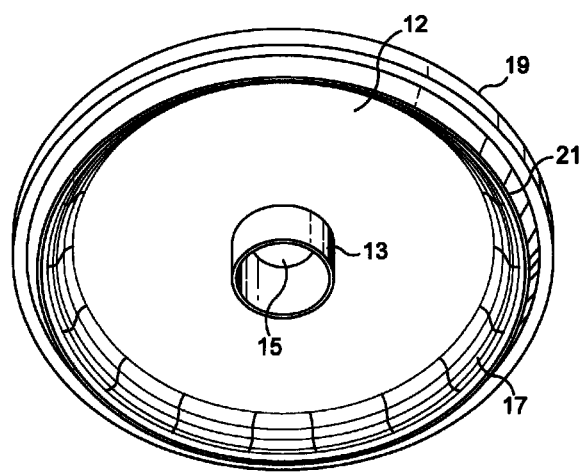
FIG. 6 is a perspective view of the lid from below of the capsule of FIG. 4.

In relation to the embodiment of FIGS. 3 to 6, the capsule of the invention comprises an inner member forming a lid 8 which is inserted in the dished body. The lid 8 and body 2 delimit together an internal enclosure 14 for receiving the food substance 22. Preferably, the capsule forms a symmetry of revolution around a central axis A. However, it should be noted that the capsule may not necessarily have a circular section around axis A but may take another form such as a square or a polygonal form. The lid 8 is illustrated in FIGS. 5 and 6. The lid can take the form of a disc of plastic comprising a central portion 9 and a peripheral portion 10. The central portion can be substantially flat and may comprise a inlet port 11 for enabling the introduction of a water injection member of the beverage production device. In the internal side 12 of the lid, the inlet port can extend by a tubular inlet portion 13 which serves for ensuring the water is guided toward the direction of the bottom of the body to ensure complete wetting of the substance in the enclosure and so reduced risk of leaving for example "dry powder spots". Preferably, the inlet port is closed by a breakable or puncturable closure part 15. This part serves to prevent substance of the enclosure from filling the interstice between the upper surface of the lid and the sealing foil. The lid further comprises a peripheral portion 10 including a collecting recess 16. The collecting recess forms a U-shape in transversal section (FIG. 3) which opens in the direction of the sealing foil. The recess is preferably continuously extending at the periphery of the lid although it can be replaced by several discontinuous recessed portions which may be separated by reinforcing elements or walls, for example. The collecting recess comprises an inner peripheral portion of wall 17 into which is provided a series of outlet openings 18 forming a fluid communication between the enclosure 14 and the collecting recess 16.

The outlet openings also form a restriction in the flow of the centrifuged liquid in the enclosure. The centrifuged liquid is forced to pass the openings which can be sized as a function of the type of beverage to be produced. For instance, for espresso or ristretto coffee extract, it can be advantageous to provide smaller openings than for lungo or "Americano" coffee extract. For a same rotational speed, smaller openings create a higher resistance to the centrifuged liquid which remains longer in the capsule. As a consequence, the interaction between water and the coffee particles is higher and liquid can charge more in coffee solids.

As illustrated in this example, the openings may be slots or holes which are distributed at intervals in the inner peripheral portion of wall 17. For example, the number of slots can range of from 5 to 200, preferably of from 10 to 100. These slots have preferably a width that is smaller than the statistical average size of the particles of the substance. For example, the slots have a width of less than 500 microns for a substance which is ground coffee. The slots may extend if necessary on the central portion 9 or in the bottom of the recess 16. The slots can be replaced by holes of circular section having a diameter smaller than the statistical average size of the particles of the substance.

Figure 13:
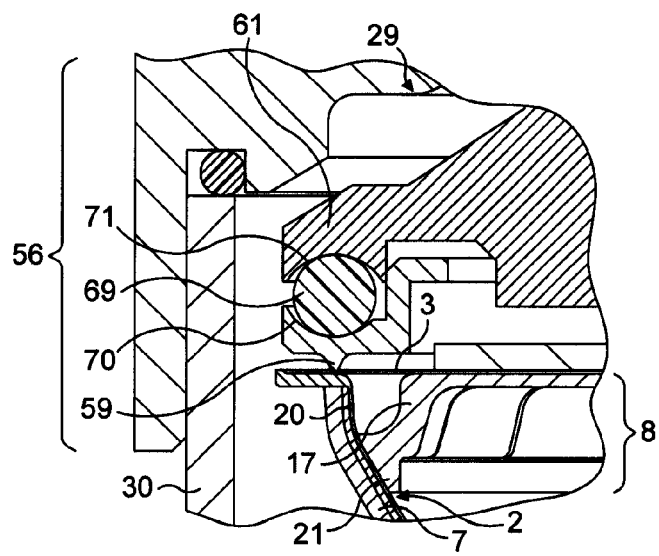
FIG. 13 is a detail view of the module of FIG. 12.

The collecting recess 16 forms a peripheral groove of small depth, e.g., between 2 and 10 mm to allow the introduction of piercing members through the sealing foil to produce outlets for the brewed liquid which is produced in the capsule as will explained later in the description. The collecting recess 16 further comprises an outer peripheral portion 19 forming an edge bearing onto a seat portion 20 of the dished body. The outer portion 19 can be engaged in the seat portion 20 by a more or less tight fit engagement. An additional sealing portion 21 extending along the internal surface of the side wall of the body and in the direction of the bottom of the dished body can extend from the recess to create further sealing against possible ingress of liquid between the lid and the inner surface of the body of the capsule. Of course, the form of the collecting recessed means can take different configurations without departing from the scope of the invention. For example, the recess 16 can be formed by the lid 8 and the side wall 7 of the dished body (as illustrated in FIG. 13). In this case, the outer peripheral portion 19 can be omitted.

As illustrated in the figures, the series of outlet openings, e.g., slots 18, are preferably placed at or close to the widening part of the enclosure relative to the central axis A. Therefore, the centrifuged liquid will tend to be guided along the inner surface of the side wall of the body, up to the inner side 12 of the lid, and then through the slots. The lid 8 is fully closed by the sealing foil 3 when it is sealed onto the rim of the dished body. In a possible alternative, the sealing foil could cover only the collecting recess including the region of the slots.

It should be noticed that the lid 8 can be a rigid or semi-rigid member made of thermoformed or injected plastic for instance. However, this part could also be made of a flexible membrane which is sealed to the inner surface of the dished body without departing from the scope of the invention.

It can also be noticed that a filter wall can also be placed inside the enclosure against the inside surface 12 of the lid. A filter wall can provide an improved filtration, for example, for substance of very thin particle size and/or for delaying the release of the centrifuged liquid out of the enclosure by creating a higher pressure drop. A filter wall can be a paper filter or thin plastic film which is glued onto the surface 12 of the lid. The lid can be simply inserted in the dished shaped body or be fixed by any suitable connection means such as by ultrasonic welding.

Figure 7:
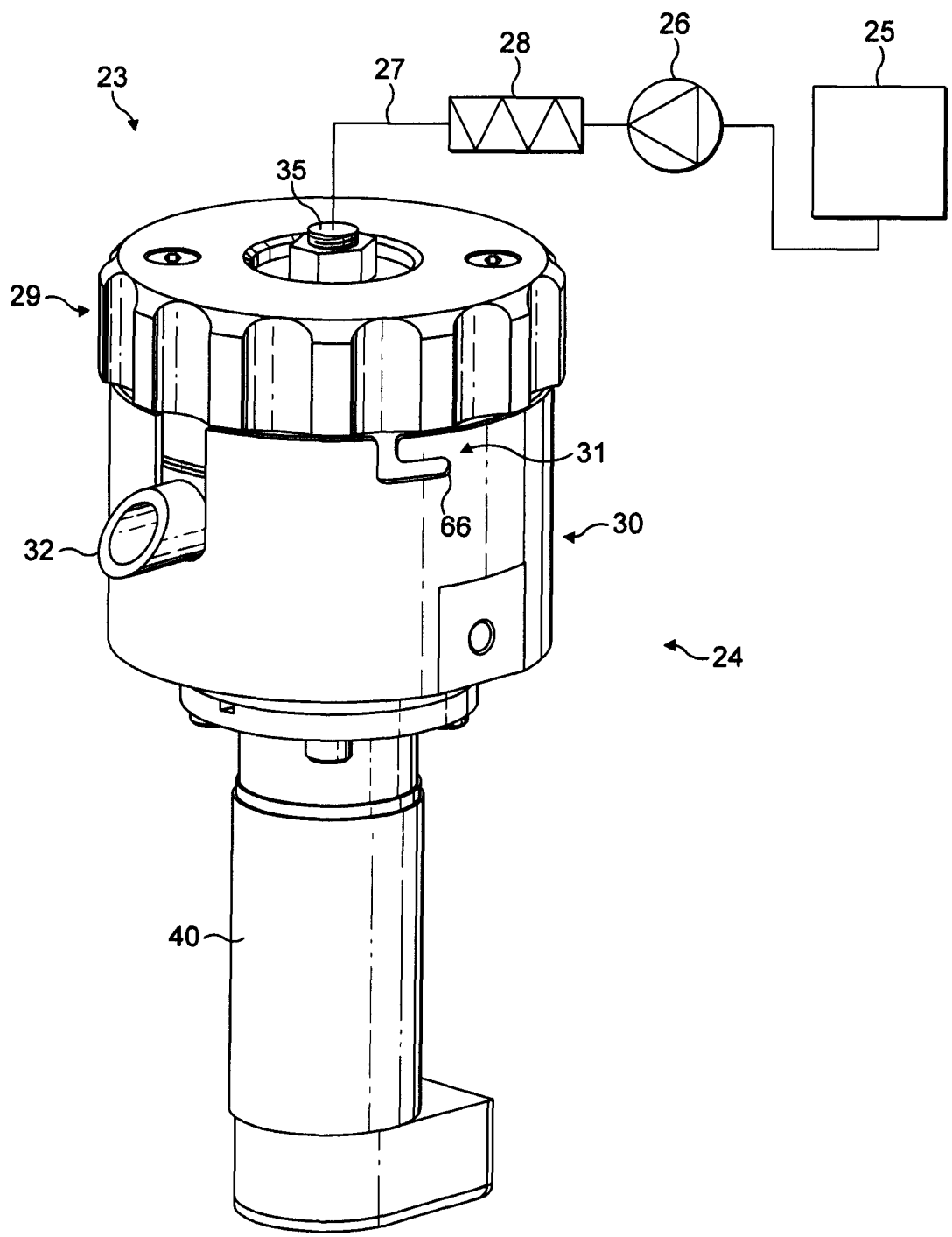
FIG. 7 is a perspective view of the beverage production device of the invention.
Figure 8:
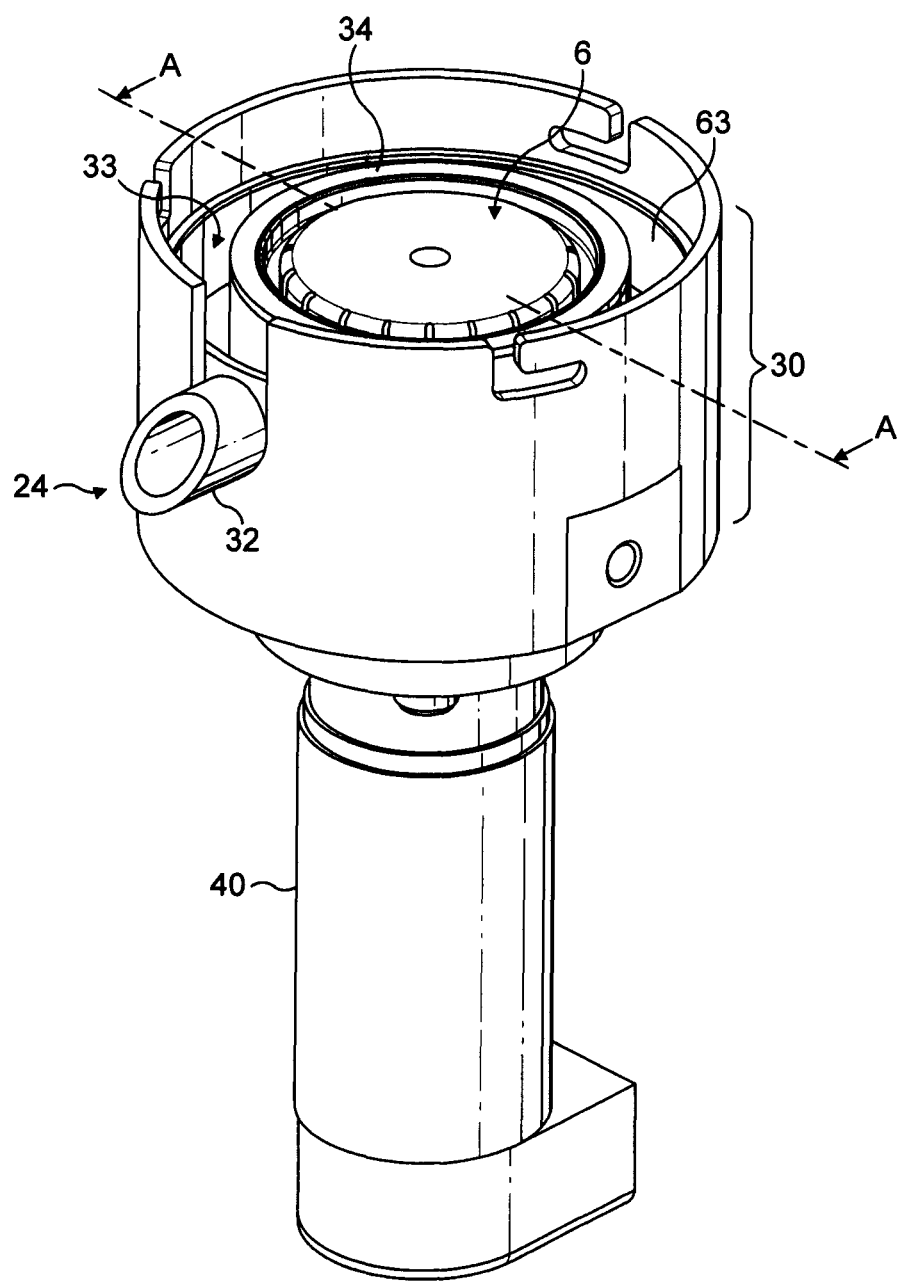
FIG. 8 is a perspective view of the beverage production module in open mode.

The system including a capsule of the invention and a beverage preparation device is illustrated in FIGS. 7 and 8 and described now.

Thus, the system comprises a capsule 1 as aforementioned and a beverage preparation device 23. The device has a module 24 into which a capsule can be inserted. The capsule contains a food substance for being brewed and the capsule is removed from the module after use for being discarded (e.g., for waste or recycling of the organic and inorganic raw materials). The module 24 is in fluid communication with a water supply such as a water reservoir 25. A fluid transport means such as a pump 26 is provided in the fluid circuit 27 between the module and the water supply. A water heater 28 is further provided to heat water in the fluid circuit before water enters the module. The water heater can be inserted in the fluid circuit to heat fresh water coming from the reservoir or alternatively can be in the water reservoir that becomes a water boiler in such case. Of course, water can also be taken directly from a domestic water supply via a water plug connection.

Water can be fed in the module 24 at low pressure or even at gravity pressure. For example, a pressure of between 0 and 2 bar above atmospheric pressure can be envisaged at the water inlet of the module. Water at higher pressure than 2 bar could also be delivered if a pressure pump is utilized such a piston pump.

The brewing module 24 can comprise two main capsule encasing sub-assemblies 29, 30; mainly comprising a water injection sub-assembly or water injection head and a liquid receiving subassembly including a capsule holder. The two subassemblies form positioning and centering means for the capsule in the device.

The two assemblies' closes together to encase a capsule therein for example by a bayonet-type connection system 31. The liquid receiving subassembly 30 comprises a liquid duct 32, for example, protruding on a side of the subassembly for guiding the centrifuged liquid coming out of the capsule to a service receptacle such as a cup or glass. The liquid duct is in communication with a liquid receiver 33 forming a cylindrical wall placed at a short distance about a capsule holder formed by a rotating drum 34 into which the capsule is inserted as illustrated in FIG. 8. The liquid receiver defines with the drum an intermediate cavity 63 for collecting the liquid as will be explained later in the description. Below the liquid receiving subassembly 30, are placed means for driving the capsule receiving drum 34 in rotation inside the subassembly.

The driving means comprise preferably a rotary motor 40 which can be supplied by electricity or gas power.

The water injection subassembly comprises a water inlet side comprising a water inlet 35 communicating upstream with the water fluid circuit 27.

Figure 9:
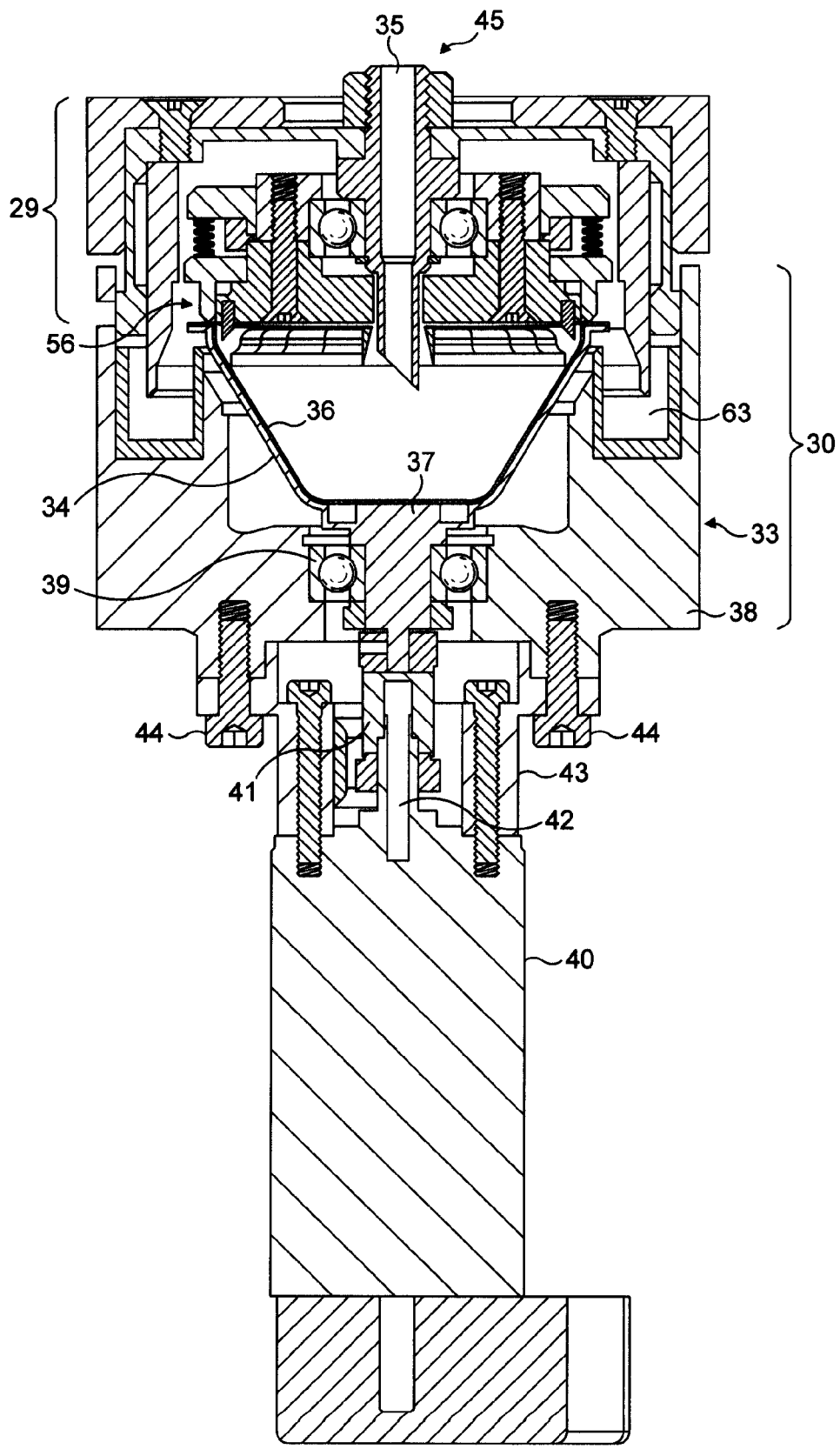
FIG. 9 is a cross-sectional view along line A-A of the beverage production module in a closed mode about the capsule.
Figure 10:
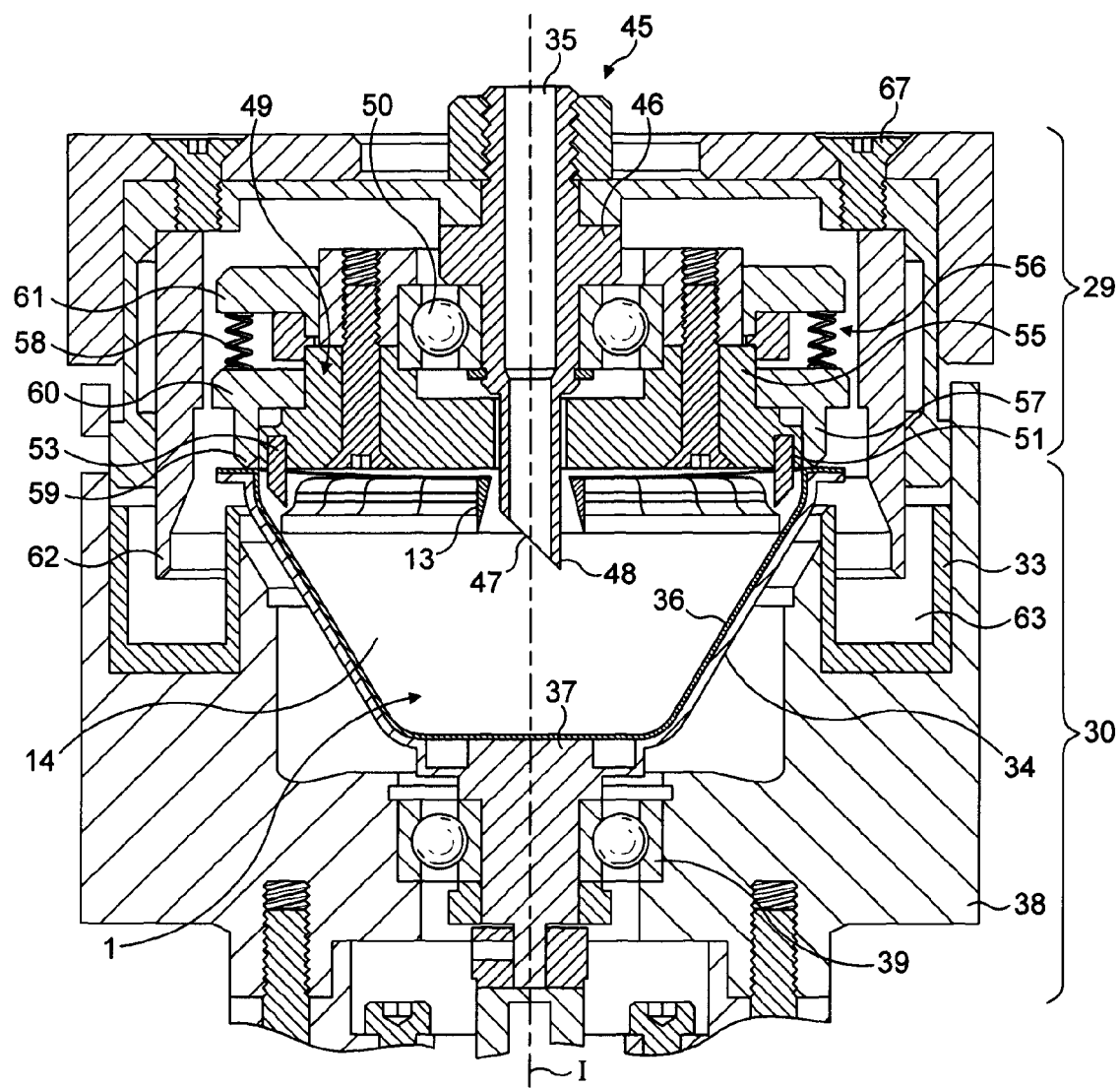
FIG. 10 is an enlarged view of the view of FIG. 9.

In relation to FIGS. 9 and 10, the rotary drum 34 is shaped as a hollow capsule holder with an internal cavity 36 complementary shaped to receive the capsule. The rotary drum 34 prolongs itself axially by a rotating shaft 37 which is maintained in rotational relationship relative to an outer base 38 of the liquid receiver 33 by a rotational guiding means 39 like a ball bearing or needle bearing. Therefore, the rotary drum is designed to rotate around a median axis I whereas the outer base 38 of the receiver is fixed relative to the device. The liquid receiver 33 can be fixed to a housing 43 of the motor by bolts 44 for example. A mechanical coupling 41 is placed at the interface between the rotating shaft 37 of the drum and the shaft 42 of the motor 40.

Figure 11:
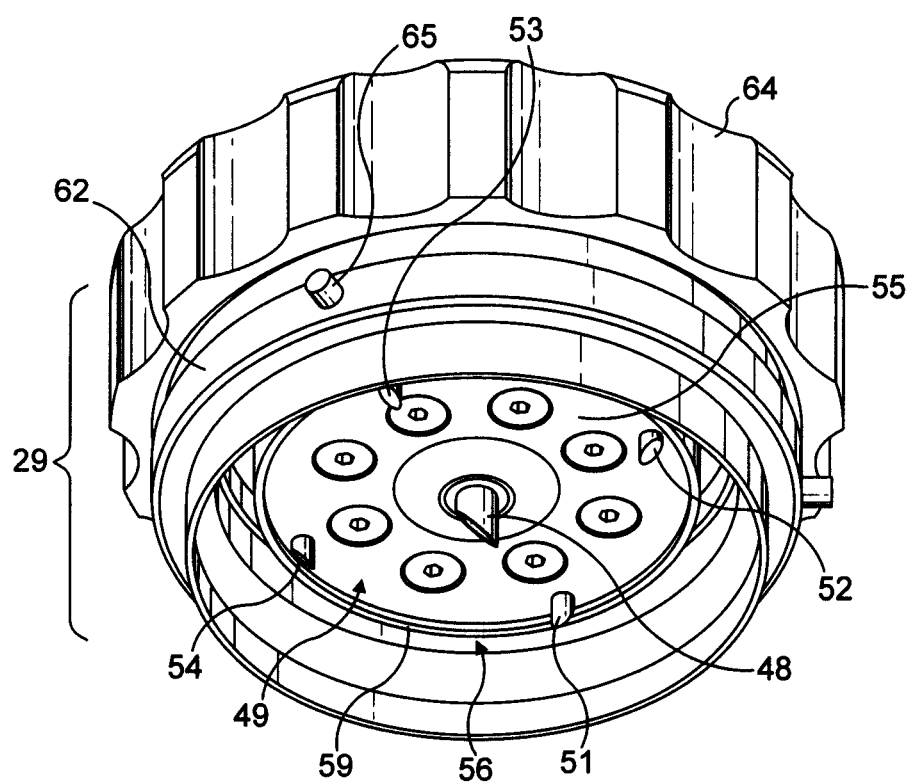
FIG. 11 is a view of the water injection assembly of the module of FIGS. 9 and 10.

Considering the water injection subassembly 29, as illustrated in FIGS. 10 and 11, it comprises a centrally arranged water injector 45 which is fixed relative to longitudinal axis I of the device. The water injector comprises a central tubular member 46 for transporting water from the inlet 35 to a water outlet 47 that is intended to protrude inside the enclosure 14 of the capsule. The water outlet is formed of a puncturing means 48 such as a sharp tubular tip that is able to create a puncture hole through the closing foil of the capsule and through the eventual breakable part of the tubular inlet 13 of the lid.

About the water injector is mounted a capsule rotary engaging part 49. The engaging part 49 has a central bore for receiving the water injector and rotational guiding means such as a ball or needle bearing 50 inserted between the part 49 and the injector 45. The engaging part further comprises outlet piercing members 51, 52, 53, 54 protruding from a disc-shaped engaging wall 55 of the part 49. The piercing members can be small cylindrical portions with a slanted cutting surface able to cut or perforate small holes in the sealing foil 3 of the capsule. The piercing members are arranged at the periphery of the wall 55, preferably evenly distributed to provide several openings in the capsule for the centrifuged liquid to leave the capsule forming several streams of liquid.

According to one aspect of the invention, the water injection subassembly 29 further comprises a valve system 56 for controlling the flow of liquid that is discharged from the device. The valve system 56 can be arranged on the capsule rotary engaging part 49 in the form of an annular engaging portion 57 which is biased under the force of elastic loading means 58 such as springs. The annular engaging portion 57 includes a pressing peripheral surface 59 which applies a closing force on the peripheral rim 4 of the capsule to be able to restrict the flow of liquid under the force of the elastic loading means. The surface 59 can form a cone or "V" for increasing the sealing pressure in a localized area. The engaging portion 57 further comprise an internal base portion 60. The elastic loading means 58 is thus inserted in a space located between the base portion 60 and a counter-force portion 61 of the engaging part 49. Therefore, at a rest position, the engaging portion 57 of the valve system keeps closing on the rim of the capsule under the compressive effect of the resilient means 58.

The capsule engaging subassembly 29 may further comprise a tubular portion of skirt 62 which protrudes in the internal annular chamber 63 of the liquid receiving subassembly 30 when the two subassemblies are closed relatively one another about a capsule. This tubular portion of skirt 62 forms an impact wall for the centrifuged liquid under pressure that passes through the valve system. This portion 62 is preferably fixed on the subassembly 29. The subassembly further comprises a handling portion 64 for facilitating the connection on the liquid receiving subassembly 30. This handling portion 64 can have a knurled peripheral surface for handling. The handling portion can be fixed on the fixed base of the subassembly 29 by screws 67.

This portion could of course be replaced by a lever mechanism or a similar handling means.

As already mentioned, connection means are provided for the relative connection of the two subassemblies 29, 30. For example, small pins 65 are provided on the side of the tubular surface of the water injection subassembly 29 which can engage side locking openings 66 on the tubular surface of the liquid receiving subassembly 30. Therefore, connection between the two subassemblies can be carried out by a rotational angular or helical closure movement for enabling the pins to engage the oblong openings 66. Of course, other connection means can be envisaged to replace this bayonet-type connection means. For instance, a threading means or a translational closure means can be envisaged by any person skilled in the art.

The capsule system of the invention works basically according to the following principle. The capsule device is opened by moving the two subassemblies 29, 30 relatively one another, e.g., by disconnecting the bayonet-type connection and separating the two subassemblies' 29, 30. As a result, a single-use sealed capsule 1 containing a food substance can inserted in the device, i.e., placed in the cavity of the rotating drum 36. The capsule can be placed in the device while the capsule being gastight closed by the sealing foil 3. The device is then closed by the subassembly 29 being connected back onto the subassembly 30 and locked by the connection means. In the locked position, the capsule is opened by the water injector that pierces through the sealing foil of the capsule and introducing itself through the water inlet 35 of the capsule. At the same time, several liquid outlets are pierced at the periphery of the sealing foil by the outlet piercing members 51-54. Water can thus be introduced in the capsule via the central water injector 45. Venting holes can be produced in the injection subassemblies to allow gas to escape the capsule while water is introduced in. The capsule can be driven in rotation by activating the rotary motor 40. The start of the centrifugal operation can be carried out at the same time as water injection start being introduced in the capsule or slightly after or before this water injection operation starts.

For instance, it might be advantageous for brewing ground coffee, to allow during several seconds that water fills in the capsule before starting the centrifugal operation by rotating the capsule. Thus, water can properly infiltrate in the coffee before, the liquid is centrifuged thereby avoiding coffee area to remain dry in the coffee portion. The centrifugation is carried out by rotating the capsule around the central axis I of rotation of the device that is preferably aligned to the central axis A of the capsule. The rotational speed is preferably of from 1000 to 12000 round-per-minutes (rpm), more preferably of from 1500 to 8000 rpm. A control unit can be provided in the device for setting the rotational speed according to the nature of the liquid to be brewed and/or the substance in the capsule. The higher the rotational speed, the higher the pressure is exerted at the peripheral wall of the capsule and the more substance is compacted on the sidewall of the capsule. It is important to notice that higher rotational speeds promote brewing of coffee extract containing a lower solid content since the residence time of liquid in the coffee bed is shorter. Lower rotational speeds provide coffee of higher strength (coffee solid content) since the residence time of liquid in the capsule is longer. Brewing takes place in the capsule by water traversing the substance thereby providing an extraction or partial or total dispersion or dissolution of the substance. As a result, a centrifuged liquid is allowed to pass through the plurality of outlet openings 18 provided in the capsule, e.g., through the lid 8.

Under the effect of centrifugal forces, the substance, such as coffee powder, tends to compact itself radially against the peripheral walls 7, 17 of the enclosure of the capsule. whereas water is forced to flow through the substance. This results in the substance being both compacted and intimately wetted by water. Due to the high rotational movement of the capsule, the centrifugal forces exert themselves uniformly on the mass of the substance. Consequently, the water distribution is also more uniform compared to usual methods using a pressure pump to exert the pressure in the capsule. As a result, there is lower risk of preferential flow path through the substance which could lead to areas which are not properly wetted and so not properly brewed, dispersed or dissolved. With ground coffee powder, the liquid that reaches the internal sidewall of the capsule is a liquid extract. This liquid extract is then forced to flow upwards along the internal surface of the sidewall of the capsule. The widening of the sidewall 7 of the capsule promotes the upward flow of the liquid in the capsule in direction of the openings.

These outlet openings 18 of the enclosure of the capsule are sized as a function of the substance stored in the capsule. Small openings such as slots of small width or holes of small diameter tend to provide a filtering function to retain the solid particles in the enclosure of the capsule while allowing only the liquid extract to pass the openings. Also as aforementioned, the openings may also provide a flow restriction that impacts on the interaction of water with the substance and on the creation of foam or crema on the top of the beverage. These holes also form sufficient restrictions that create shear forces and consequently generate foam or coffee crema. Some gas contained in the capsule can become entrapped in the liquid and forms, due to the pressure release after the flow restriction, a multitude of small bubbles in the liquid.

Also, the valve system 56 of the device can start opening as pressure of liquid increases on the valve when leaving the capsule. Therefore, a certain time delay before opening can be controlled by the valve system to enable sufficient interaction between water and the substance contained in the capsule. This controlled delay depends on various parameters such as the centrifugal speed, the force exerted by the elastic loading means (i.e., spring stiffness), the pressure drop as created by the substance and outlet openings, etc. The opening of the valve system occurs by the pressing surface 59 of the valve system lifting as pressure of liquid increases on its internal surface. It can be noted that the capsule of the rim can also be substantially flexible to flex under the effect of the pressure of liquid. Therefore, the relative movement between the pressing surface and the capsule create a small passage for the liquid to escape out of the small interstice upstream of the valve system. At relatively high rotational speeds, a jet of liquid can be formed that impacts on the internal surface of the portion of skirt 62. The liquid starts to fill the cavity 68 of the liquid receiving subassembly and liquid can drain through the liquid duct 32 to be collected in a cup or glass placed underneath.

Figure 12:
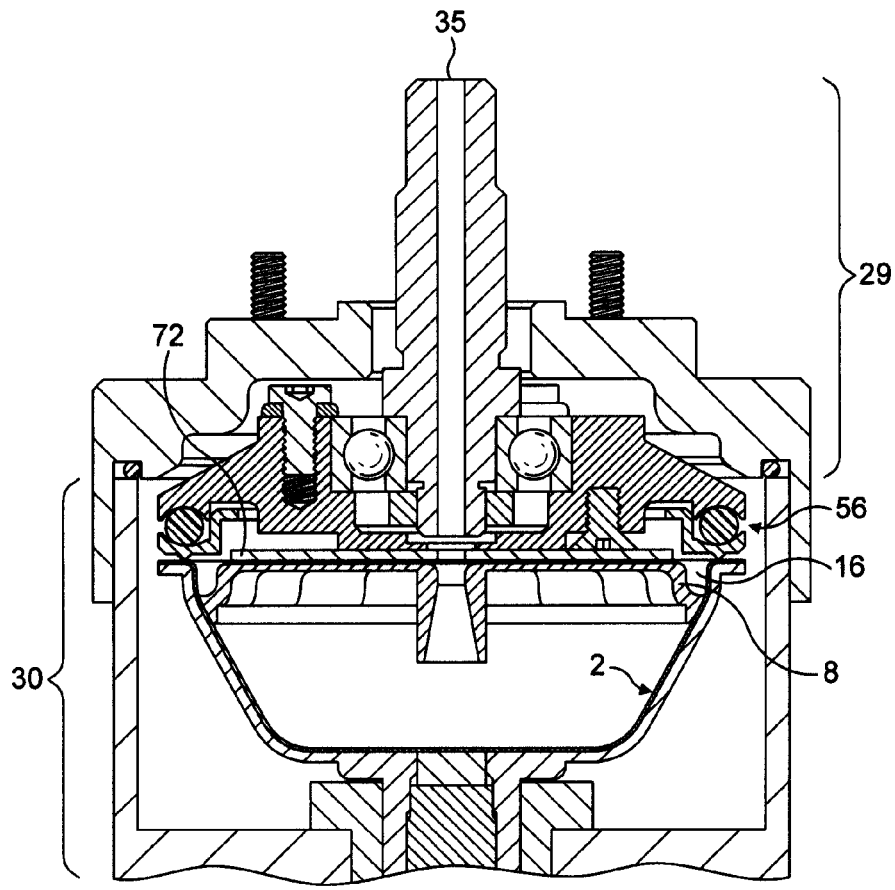
FIG. 12 is a cross sectional view of a beverage production module similar to FIG. 9 but for another embodiment of the invention.

In the other mode of the invention illustrated in FIGS. 12 and 13, the same numeral references have been taken to identify the same or equivalent technical means. In this mode, the valve system 56 differs in that the elastic loading means is obtained by a rubber elastic O-ring 69 inserting between a pinching surface 59 and a fixed portion 61 of the water injection subassembly 29. The O-ring is maintained between two concave portions 70, 71 of the valve system. Again during brewing, the pressure of liquid in the capsule tends to lift the pinching surface 59 to create a passage between the rim 4 of the capsule and the pinching surface. The pinching surface can be shaped with a sharp tip or edge that can create a concentration of forces on the rim. Of course, it could be imagined that the elastic loading means and the pinching portion are the same element. For example, the pinching portion can be made of rubber-elastic material.

In the mode of FIG. 12 or 13, the water injector can be a simple water inlet in the capsule with no puncture means. In this case, the capsule is pre-opened before it is inserted in the device, i.e., the sealing foil is removed by peeling, or a central hole is perforated before the capsule is inserted in the device. Furthermore, a sealing engagement of the water injector can be performed by a sealing means 72 which applies a certain sealing pressure on the top surface of the capsule. Therefore, water is prevented from leaking along the top surface of the capsule and from by-passing the capsule to release directly through the liquid outlet.

Figure 14:
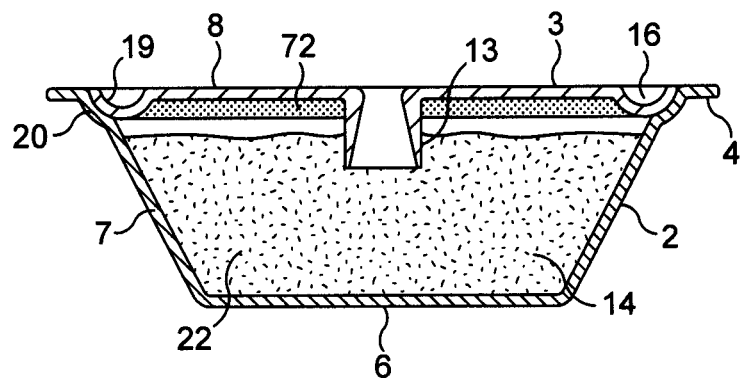
FIG. 14 is a cross section view of a variant of the capsule of the invention.
Figure 15:
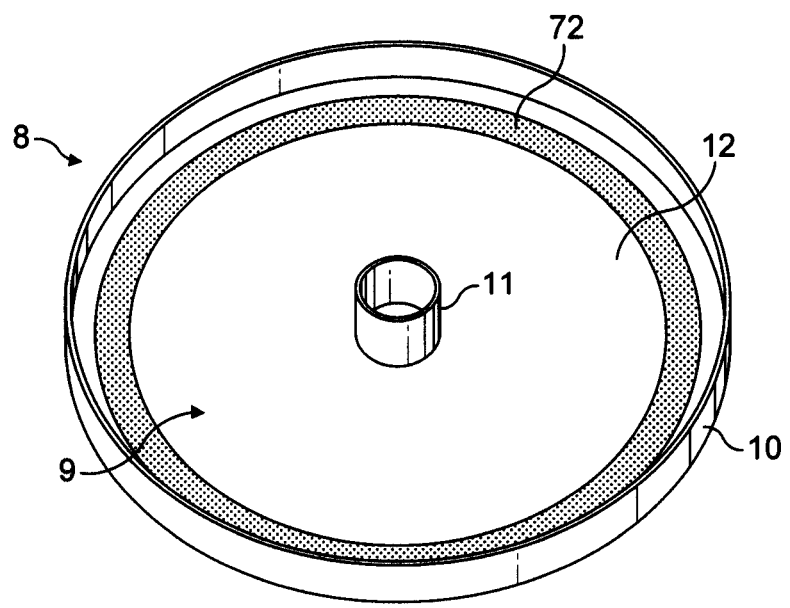
FIG. 15 is a view from underside of the lid of the capsule of FIG. 14.

The capsule of the invention can take various embodiments such as the one illustrated in FIGS. 14 and 15. The general structure of the capsule is the same as for the previous embodiment except that the outlet openings are formed by a filter paper, a woven or non-woven portion or another meshed or porous membrane 72. Thus, the lid 8 which is inserted in the dished body 2 comprises a circumferential band of a porous material. The porous material provides restriction of the flow, creating a certain pressure drop, e.g., between 0.5 and 4 bar, and leading to a filtering of the solid particles. In particular, the size of the pores of the material can be chosen to retain also the coffee fines, i.e., the particles of particle size as low as 90 microns. The pressure drop is also obtained when the overall open surface of the porous band is lower than 50% of the total surface area of the surface of the band. The paper, fabric, meshed or porous material can be formed of a band or bands which can be welded or otherwise combined to the lid.

In another possible mode, the recess 16 can be filled by a porous compressible material to provide a filtering function as well. For example, the material could be sponge or fabric.

Figure 16:
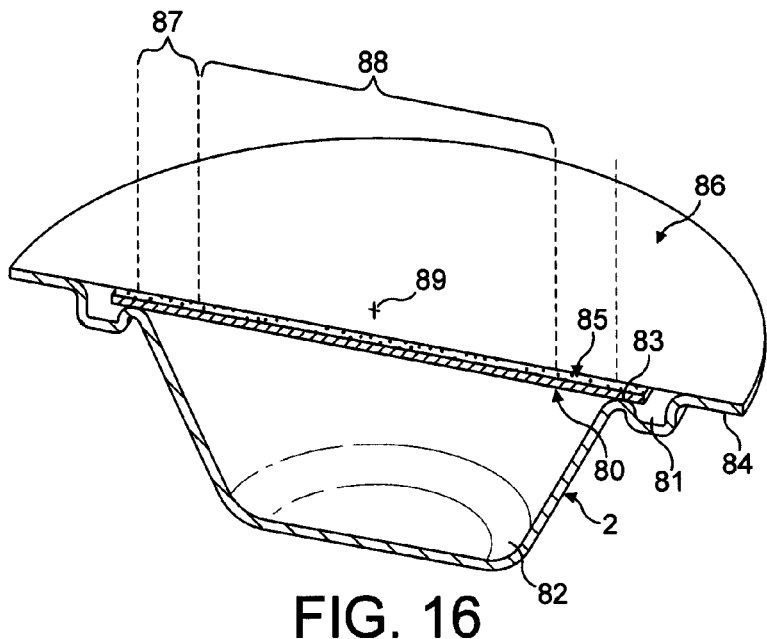
FIG. 16 is a perspective cross sectional view of a capsule according to another mode of the invention.
Figure 17:
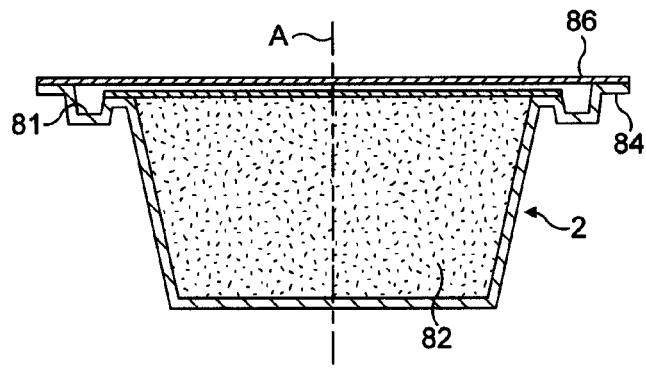
FIG. 17 is a cross sectional view of the capsule of FIG. 16.

According to FIGS. 16 and 17, the capsule in the system of the invention may also comprise an enclosure which is formed of a dished body 2 and a porous wall 80. The dished body comprises a main cavity 82 for storing the food substance and a peripheral recess 81 for receiving the liquid extract that traverses the porous wall 80 during the centrifugation process. The recess 81 is delimited by an inner edge 83 and an outer rim 84. The porous wall 80 can be attached to an inner edge 83 of the recess 81. A gastight foil membrane 86 is preferably attached onto the outer rim 84 of the body. The inner edge is preferably placed below the outer rim in order to let a free space 85 between porous wall 80 and the foil membrane 86. The porous wall can be sealed by heat or ultrasonic welding onto the inner edge 83.

The porous wall 80 can have openings (i.e., pores) along its whole surface or along a peripheral portion of wall only. FIG. 16 shows a portion of the wall 87 which normally have the openings whereas the central portion 88 is free of openings.

In a different mode the two portions 87, 88 have the openings.

The pressure is dependent on various factors, in particular, the rotating speed of the capsule in the device, the radius at the peripheral portion of wall 87 (specially, determining the relative centrifugal force "g" at the portion 87) and the size of the openings. The size of the openings is preferably comprised between 1 and 600 microns. More preferably, the size of the openings is comprised between 10 and 200 microns forming a flow restriction means which creates a certain drop of pressure during the centrifugation of the capsule along its central axis. The overall surface area of the pores of the porous wall should be lower than 50% of the total surface area of said wall, most preferably lower than 40%.

The capsule of FIGS. 16 and 17 can be pierced in its centre 89 for injecting water in the enclosure 82 containing the substance. As a result both the outer foil 86 and the inner wall 80 are pierced. The capsule is inserted in a device as described before. The capsule is driven in centrifugal rotation at a determined speed, e.g., between 1000 and 16000 rpm, more preferably between 5000 and 12000 rpm. The brewing or dissolution process takes place in the enclosure by water traversing the substance. As a result of the centrifugal effect, the food liquid traverses the porous portion of wall 87, (eventually also part of the portion 88 if porous) and leaves the enclosure via the interspace 85 then via the annular recess 81. The liquid is allowed to leave the capsule via pierced holes made in the foil above the recess 81.

Figure 18:
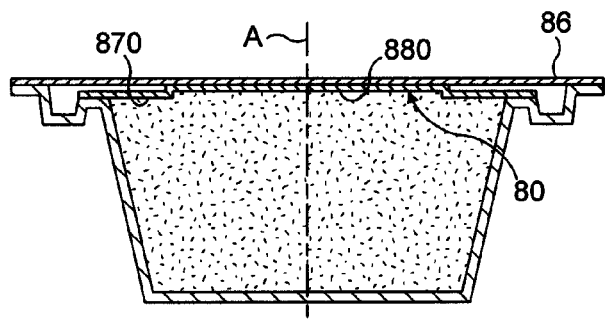
FIG. 18 is a cross sectional view of a capsule according to still another mode.

FIG. 18 shows a similar capsule but with the inner porous wall 80 comprising a central portion 880 which is sealed to the external gastight foil 86 and a peripheral portion 870 which is distant from the foil 86. In this example, the peripheral portion 870 comprises the outlet openings of the enclosure. The central portion 880 may have openings or may be free of openings. In this embodiment, no liquid is allowed to go between the outer foil 86 and the inner portion of wall 880 since both are sealed together. If a sufficient pressure drop is created at the portions of wall 870 in the capsule, the device may not necessarily be provided with an additional flow restriction means such as the valve described previously. In this case, the flow restriction means in the capsule suffices to maintain a sufficient pressure in the enclosure and so obtain a good interaction between the substance, e.g., ground coffee and water. For example, good espresso-type coffee with crema can be produced with a capsule comprising a woven polymer membrane comprising pores within a range of between 10 to 200 microns.

It can be noted that the peripheral portion of the capsule comprising the restriction means, e.g., openings, can be substantially oriented perpendicularly to the axis of rotation as in the examples of FIGS. 16 to 18 or inclined relative to said axis as in the example of FIGS. 1 to 6.

In another possible mode, the flow restriction can be obtained or complemented by chicanes in the capsule and/or in the device or a similar structure forming a tortuous flow path for the liquid.

The system capsule of the invention provide remarkable brewing results with solid contents which are higher than with usual systems. The results are very reproducible from capsule to capsule. Surprisingly, crema is also remarkably improved with a creamier, more stable and thicker texture.

It can be noted that the pressure drop of the restriction means can be measured by a pressure measurement test consisting of filling water under pressure in the capsule and measuring the pressure of water at the injection point at which liquid is allowed to pass the restriction means, i.e., the valve system.

Of course, the invention may encompass many variants which are included in the scope of the patent claims that follow.

What is claimed is:

1. A method for preparing a food liquid from a food substance contained in a sealed, single-use capsule, in a liquid food preparation device comprising a water injection head for injecting water in the capsule and a capsule holder for holding the capsule in the device; the capsule configured for removable insertion in the capsule holder and comprising a cup shaped body covered by a sealing lid that has a peripheral rim by passing water through the substance, the method comprising:

piercing the sealing lid of the sealed capsule by a piercing member of a water injector of the water injection head and introducing water by the water injector into a generally central portion of the capsule,
    forming a series of liquid delivery outlets by a series of additional piercing members in the sealing lid of the capsule at the periphery of the sealing lid near the peripheral rim of the body,
    after the outlets are formed in the lid of the capsule, centrifugally rotating the capsule about its central axis for passing water outwardly from the generally central portion through the substance and then toward the liquid delivery outlets of the lid to form the food liquid,
    delivering the food liquid as several streams of liquid from the delivery outlets formed in the lid of the capsule, and
    passing the food liquid delivered from the capsule through a restriction valve and wherein the restriction valve opens when a certain pressure is exerted by centrifuged food liquid on the restriction valve.

2. The method according to claim 1, wherein the water is introduced in the capsule through an opening of the piercing member the water injector that has a diameter of between 0.9 and 5 mm.

3. The method according to claim 1, which further comprises:

providing a water inlet in a central portion of the capsule, wherein the water is introduced from the water injector into the water inlet in the central portion of the capsule; and providing the capsule with sloped walls from a narrower capsule bottom to a wider capsule top portion to assist in directing the liquid to the outlets when the capsule is rotated.

4. The method of claim 1, wherein the water injection head introduces the water into the capsule along the central axis of the capsule holder.

5. The method of claim 1, wherein the series of piercing members for forming the outlets are distributed along a substantially circular path about the central axis of the capsule holder.

6. The method of claim 5, wherein the series of piercing members comprises at least four members for forming at least four liquid delivery outlets around the periphery of the capsule.

7. The method of claim 1, which further comprises contacting the capsule by a rotary engaging member after the capsule is inserted into the device, and providing the delivery outlet in the rotary engaging member or the capsule holder during relative engagement or closure of the rotary engaging member and the capsule holder.

8. The method of claim 1, wherein the piercing member is arranged as a hollow piercing tube for injecting water into the capsule.

9. The method of claim 8, wherein the piercing member has a diameter of between 0.9 and 5 mm.

10. The method of claim 1, which is conducted in a system comprising the liquid food preparation device.

11. A method for preparing a food liquid from a food substance contained in a sealed, single-use capsule in a liquid food preparation device comprising a water injection head for injecting water in the capsule and a capsule holder and a capsule holder for holding the capsule in the device; the capsule; the capsule configured for removable insertion in the capsule holder and comprising a cup-shaped body having sloped walls from a narrower capsule bottom to a wider capsule top portion covered by a sealing lid that has a peripheral rim by passing water through the substance, the method comprising:

piercing the sealing lid of the sealed capsule by a piercing member of a water injector of the water injection head and introducing water by the water injector into a generally central portion of the capsule,
    centrifugally rotating the capsule about its central axis for passing water outwardly from the generally central portion through the substance and then along the sloped walls towards the peripheral rim of the lid to form the food liquid, forming an opening comprising a series of liquid delivery outlets along the peripheral rim of the sealing lid of the capsule before centrifugally rotating the capsule, wherein the outlets are formed by a series of piercing members and to assist in allowing the water to pass through the food substance and to allow the food liquid to exit the capsule,
    delivering the food liquid from delivery outlets formed in the lid of the capsule as several streams of liquid after the water has passed through the food substance, and
    passing the food liquid delivered from the capsule through a restriction valve and wherein the restriction valve opens when a certain pressure is exerted by the centrifuged food liquid on the restriction valve.

12. The method of claim 11, wherein the restriction valve is further provided by a valve means, and wherein the valve means is adjusted to selectively open a liquid passage through the capsule at an exerted threshold of pressure build-up inside the capsule.

13. The method of claim 12, wherein the valve means comprises an annular closure ring and an elastic means for elastically engaging the ring in the closure onto a peripheral part of the capsule.

14. The method of claim 13, wherein the valve means is formed by at least one engaging portion of the device which moves relatively to an engaging portion of the capsule exerted on the valve on the pressurized liquid such that foam is created due to the restriction which is created by the valve means and by the impact of the liquid on the surface of the device.

* * * * *